United States Patent
Akiyama et al.

(10) Patent No.: US 12,290,993 B2
(45) Date of Patent: May 6, 2025

(54) COMPOSITE PRE-BONDING TREATMENT METHOD

(71) Applicant: MITSUBISHI HEAVY INDUSTRIES, LTD., Tokyo (JP)

(72) Inventors: Hiromichi Akiyama, Tokyo (JP); Kiyoka Takagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 6 days.

(21) Appl. No.: 17/627,394

(22) PCT Filed: Jun. 3, 2020

(86) PCT No.: PCT/JP2020/021956
§ 371 (c)(1),
(2) Date: Jan. 14, 2022

(87) PCT Pub. No.: WO2021/010044
PCT Pub. Date: Jan. 21, 2021

(65) Prior Publication Data
US 2022/0258433 A1 Aug. 18, 2022

(30) Foreign Application Priority Data
Jul. 16, 2019 (JP) ................. 2019-131066

(51) Int. Cl.
*B29C 65/00* (2006.01)
*B29C 65/48* (2006.01)
(52) U.S. Cl.
CPC .......... *B29C 66/0224* (2013.01); *B29C 65/48* (2013.01); *B29C 66/0242* (2013.01)
(58) Field of Classification Search
CPC ............ B29C 66/0224; B29C 66/0242; B29C 66/919; B29C 66/1122; B29C 66/45;
(Continued)

(56) References Cited

U.S. PATENT DOCUMENTS

| 9,254,622 B2 | 2/2016 | Flinn | |
| 2010/0243170 A1* | 9/2010 | Wilenski | B29C 70/549 |
| | | | 156/380.9 |

(Continued)

FOREIGN PATENT DOCUMENTS

| JP | 10-296765 | 11/1998 |
| JP | 2014-015567 | 1/2014 |

(Continued)

OTHER PUBLICATIONS

Airtech Europe Sarl, "Section Guide-Release Films", Last Updated Jun. 26, 2012 as stated on p. 2. Included in IDS filed Jan. 14, 2022. (Year: 2012).*

(Continued)

*Primary Examiner* — Alex B Efta
*Assistant Examiner* — Alexander S Wright
(74) *Attorney, Agent, or Firm* — Wenderoth, Lind & Ponack, L.L.P.

(57) ABSTRACT

An object is to provide a composite pre-bonding treatment method that stabilizes quality of a bonded part. The present disclosure provides a composite pre-bonding treatment method performed when bonding a composite material to a member. The method includes: (S2) attaching an absorber adapted to absorb a contaminant to a surface of a prepreg laminate that is a precursor of the composite material; (S3) covering the prepreg laminate with a packaging material from above the absorber; (S4) vacuuming the packaging material and heating the prepreg laminate at a temperature lower than a curing temperature of a prepreg; (S5) then removing the packaging material; (S6) peeling off the absorber; (S7) attaching, to a surface of the prepreg laminate with the absorber peeled off, a release member that does not transfer silicone or fluorine to a resin, and then (S9) curing the prepreg laminate to mold the composite material; and (Continued)

(S11) peeling off the release member from the composite material before bonding the member.

5 Claims, 4 Drawing Sheets

(58) Field of Classification Search
CPC . B29C 66/71; B29C 66/7212; B29C 66/7373; B29C 66/73751; B29C 66/73755; B29C 66/73941; B29C 66/72141; B29C 66/02; B29C 65/48; B29C 65/02; B29C 59/08; B29C 59/10; B29C 59/14; B29C 59/16; B29C 70/44; B29C 70/54; B29C 37/0075; B32B 37/142; C09J 5/02

See application file for complete search history.

(56) References Cited

U.S. PATENT DOCUMENTS

| | | | |
|---|---|---|---|
| 2013/0129957 A1 | 5/2013 | Zhao et al. | |
| 2014/0144568 A1 | 5/2014 | MacAdams et al. | |
| 2017/0282446 A1 | 10/2017 | Cavaliere et al. | |
| 2020/0055261 A1* | 2/2020 | Nelson | B29C 66/72141 |

FOREIGN PATENT DOCUMENTS

| | | |
|---|---|---|
| JP | 2015-508346 | 3/2015 |
| JP | 2016-501145 | 1/2016 |
| JP | 5905704 | 4/2016 |
| JP | 6033328 | 11/2016 |
| WO | 2018/170330 | 9/2018 |

OTHER PUBLICATIONS

Mitsubishi Heavy Industries Technical Review. "Atmospheric Pressure Plasma Treatment for Composites Bonding" vol. 55 No. 2, Jun. 2018. Included in IDS Filed Apr. 14, 2022. (Year: 2018).*

CKN "Cure of thermosetting polymers—A162" Last Edited Mar. 10, 2021. Accessed Nov. 27, 2023 at <https://compositeskn.org/KPC/A162> Not Prior Art (Year: 2021).*

Hiromichi Akiyama et al., "Atmospheric Pressure Plasma Treatment for Composites Bonding", Mitsubishi Heavy Industries, Technical Review, vol. 55, No. 2, Jun. 2018, New Technologies (4 pages).

Hiromichi Akiyama et al., "Atmospheric Pressure Plasma Treatment for Composites Bonding", Proceedings of The 43th Composite Materials Symposium, Japan Society for Composite Materials (2 pages), with partial English translation.

Written Opinion issued Jul. 21, 2020 in corresponding International (PCT) Patent Application No. PCT/JP2020/021956.

Extended European Search Report issued Jul. 14, 2022 in European Application No. 20840826.0.

International Search Report issued Jul. 21, 2020 in International (PCT) Application No. PCT/JP2020/021956.

Airtech, Europe Sarl, Catalogue position : Release film, Jan. 18, 2010, 13 pages

* cited by examiner

--Prior Art--

FIG. 4

COMPOSITE PRE-BONDING TREATMENT METHOD

TECHNICAL FIELD

The present invention relates to a composite pre-bonding treatment method.

BACKGROUND ART

Prepregs have been used as intermediate materials of composite materials of fiber reinforced plastic (FRP). Prepregs are supplied as sheets in which fibers are impregnated with a resin. Such sheets are laminated and cured to mold an FRP panel.

Conventionally, to bond FRP panels to each other or to bond an FRP panel to another member, dirt on the panel surface is removed by sanding using sand paper or a peel ply method (see Patent Literature 1, for example) to create a clean surface, and then an adhesive agent is applied thereto.

In a peel ply method, a peel ply cloth (hereafter, referred to as a peel ply) is used to form a clean surface. A conventional pre-bonding treatment method in accordance with the peel ply method will be described with reference to FIG. 4.

Figure 4:
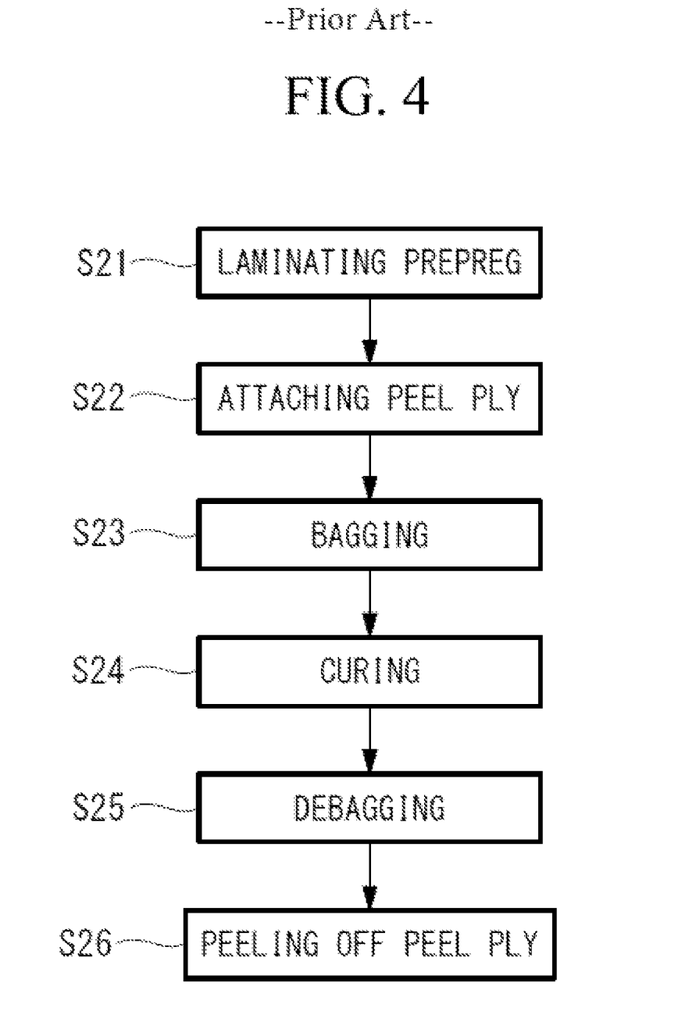
FIG. 4 is a diagram illustrating a procedure of a composite pre-bonding treatment method in a conventional method.

First, (S21) prepregs are laminated, (S22) a peel ply is attached thereto, (S23) the prepregs and the peel ply are covered with a bagging material, and (S24) curing is performed thereon by heating and pressing to mold a composite material.

Next, (S25) the bagging material is removed (debagged), and (S26) the peel ply is peeled off. The surface from which the peel ply has been peeled off is to be bounded with a member.

CITATION LIST

Patent Literature

[PTL 1]
Japanese Patent Application Laid-Open No. 2015-508346

SUMMARY OF INVENTION

Technical Problem

Since sanding is performed manually, the quality may vary in accordance with the skill level of a worker, and this may cause damage on fibers.

The peel ply method uses a peel ply mainly formed of a polyester fiber. Since polyester has poor adhesiveness with a matrix resin of prepregs, dissociation typically occurs between the peel ply and the prepreg when the peel ply is peeled off after cured.

However, if heating is excessively performed during molding of a composite material or peeling is performed in a wrong way, a polyester component may remain on the FRP surface, and this may reduce adhesiveness of a bonded part of the FRP panel.

When no peel ply is used, a release agent component (organic silicon compound) or a release film component (fluorine resin) used in molding is transferred to the surface of the composite material, or a silicone component derived from a release sheet used in production of the prepreg may remain on the surface of the prepreg. The transferred component and the remaining component may reduce the adhesive force at a bonded part, and this may cause unstable quality of the bonded part.

The present disclosure has been made in view of such circumstances, and an object of the present disclosure is to provide a composite pre-bonding treatment method that can stabilize quality of a bonded part.

Solution to Problem

To achieve the object described above, a composite pre-bonding treatment method of the present disclosure employs the following solutions.

The present disclosure provides a composite pre-bonding treatment method performed when bonding a composite material to a member, and the composite pre-bonding treatment method includes: attaching an absorber adapted to absorb a contaminant to a surface of a prepreg laminate that is a precursor of the composite material; covering the prepreg laminate with a packaging material from above the absorber; vacuuming the packaging material and heating the prepreg laminate at a temperature lower than a curing temperature of a prepreg; then removing the packaging material; peeling off the absorber; attaching, to a surface of the prepreg laminate with the absorber peeled off, a release member that does not transfer silicone or fluorine to a resin, and then curing the prepreg laminate to mold the composite material; and peeling off the release member from the composite material before bonding the member.

The absorber attached to the prepreg laminate can absorb contaminants present on the prepreg laminate surface. Herein, the contaminant may be silicone, fluorine, or oil derived from a release sheet used when a prepreg is produced, an organic substance not derived from a prepreg, or the like.

The prepreg laminate to which the absorber is attached is vacuumed, and thereby contaminants are absorbed in the absorber. Since heating reduces the viscosity of a matrix resin contained in the prepreg, contaminants can be effectively absorbed. Accordingly, before a release member is attached, contaminants are removed from the prepreg laminate surface, and a clearer surface can be formed.

In the present disclosure, instead of a peel ply used in the conventional method, a release member that does not transfer silicone or fluorine to a resin is attached to a prepreg laminate. Thus, no peel ply component will remain on the surface of the composite material. The release member does not transfer silicone or fluorine to a resin. Thus, neither silicone nor fluorine will remain on the surface of the composite material after the peeling. According to the present disclosure, a clearer surface is formed due to a reduction in the amount of a peel ply remaining on the surface of the composite material and a reduction in contaminants derived from the release member. This prevents a reduction in strength of a bonded part when bonded to a member, and stabilizes the quality.

In one aspect of the present disclosure, after the release member is removed and before the member is bonded, hydrophilic treatment can be applied to the surface on which the release member of the composite material was attached.

The hydrophilic treatment may be a process of adding a polar functional group to the surface of the composite material on which the release member was attached, through plasma treatment, corona treatment, ultraviolet treatment, flame treatment, or treatment with a liquid.

Application of the hydrophilic treatment causes oxygen radicals to be generated on the surface of the composite material. Oxygen radicals react with carbon (C), hydrogen (H), or the like of surface dirt (contaminant) such as an oil, an organic substance, or the like. Accordingly, the contaminant is removed as $CO_2$, $H_2O$, or the like from the surface of the composite material.

Application of the hydrophilic treatment causes a polar functional group containing oxygen, for example, a hydroxy group (OH), a carbonyl group (C=O), a carboxyl group (COOH), or the like to be generated on the surface of the composite material. These functional groups are hydrogen-bound to an adhesive agent. This provides stronger adhesive force than the van der Waals force and improves the adhesive strength of a bonded part.

The composite material in which a polar functional group is generated exhibits increased surface free energy and enhanced adhesive strength. This can compensate for a reduction in adhesive strength due to contaminants even when a small amount of contaminants remains.

The hydrophilic treatment can be automated and thus can more stably clean the surface than manual sanding regardless of the skill level of a worker.

In one aspect of the present disclosure, before the hydrophilic treatment, cleaning treatment may be applied to the surface on which the release member of the composite material was attached, and a contaminant attached after the release member is peeled off may be removed.

In one aspect of the present disclosure, the prepreg may be produced by using a resin support member that does not transfer silicone or fluorine to a resin, and multiple layers of the prepreg may be laminated to form the prepreg laminate.

By forming a laminate with prepregs produced by using a resin support member that does not transfer silicone or fluorine to a resin, it is possible to more reliably prevent surface contamination of the prepregs.

In one aspect of the present disclosure, the release member may be formed of a material that does not include fluorine or silicone. This makes it possible to more reliably prevent silicone and fluorine from being transferred to the surface of a composite material.

The present disclosure provides a composite pre-bonding treatment method performed when bonding a composite material to a member, and the composite pre-bonding treatment method includes: producing prepregs by using a resin support member that does not transfer silicone or fluorine to a resin; laminating multiple layers of the prepregs to form a prepreg laminate; attaching, to a surface of the prepreg laminate, a release member that does not transfer silicone or fluorine to a resin, and then curing the prepregs to mold the composite material; and peeling off the release member from the composite material before bonding the member.

Advantageous Effects of Invention

According to the present disclosure, contamination on the prepreg surface and the composite material surface is reduced to form a surface suitable for bonding, and this can stabilize the quality of a bonded part of a composite material.

DESCRIPTION OF EMBODIMENTS

One embodiment of a composite pre-bonding treatment method according to the present disclosure will be described below with reference to the drawings.

First Embodiment

Figure 1:
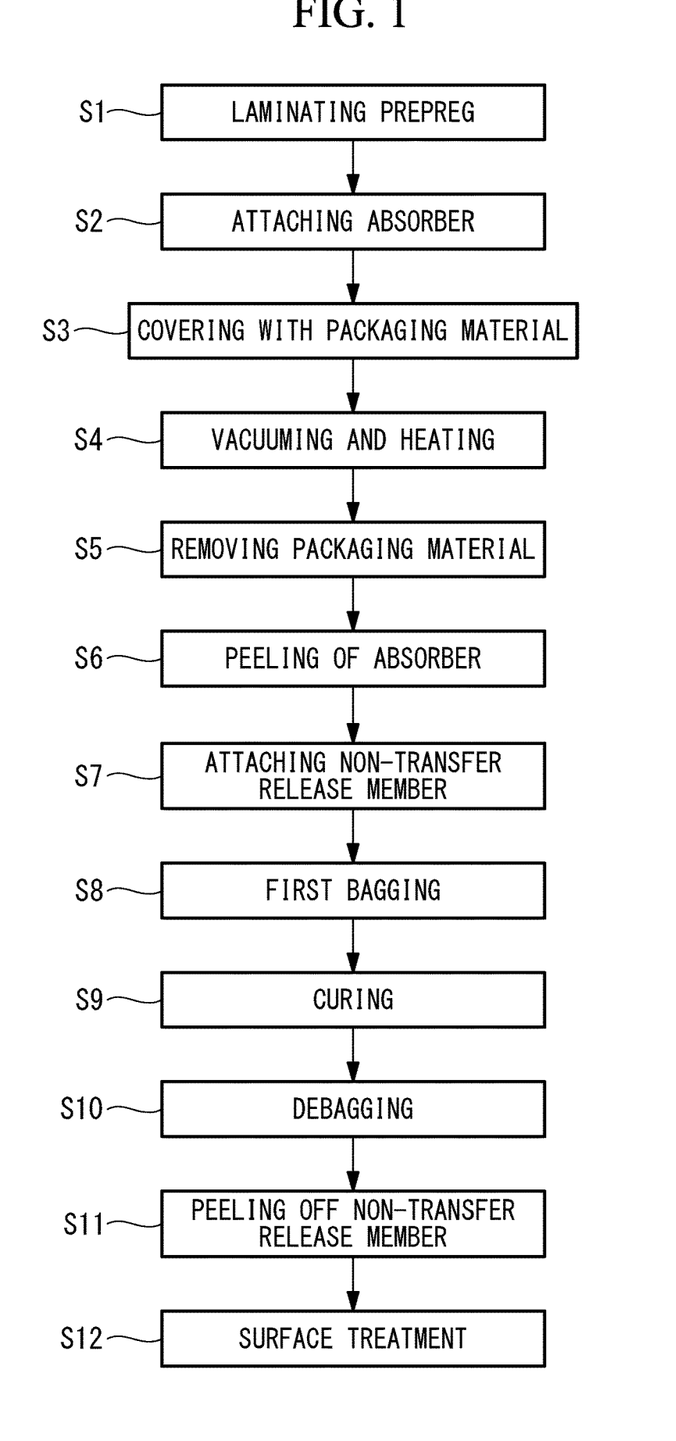
FIG. 1 is a diagram illustrating a procedure of a composite pre-bonding treatment method according to a first embodiment.

FIG. 1 illustrates a procedure of the pre-bonding treatment method according to the present embodiment.

In the present embodiment, (S1) multiple layers of prepregs are laminated to form a prepreg laminate, (S2) an absorber that can absorb a contaminant is attached to the surface of the prepreg laminate, (S3) the prepreg laminate is covered with a packaging material from above the absorber, (S4) the inside of the packaging material is vacuumed and the prepreg laminate is heated at a temperature lower than the curing temperature of the prepreg, then (S5) the packaging material is removed, (S6) the absorber is peeled off, (S7) a release member (non-transfer release member) that does not transfer silicone or fluorine to a resin is attached to the surface with the absorber of the prepreg laminate peeled off, (S8) the prepreg laminate is covered with a bagging material from above the release member, and (S9) the prepreg laminate is cured by heating and pressing to mold a composite material.

Then, (S10) the bagging material is removed, and (S11) the release member is peeled off from the composite material before a member is bonded thereto.

When further improvement of adhesiveness is intended, (S12) after the release member is peeled off and before the member is bonded thereto, hydrophilic treatment (surface treatment) may be applied to the surface of the composite material on which the release member was attached.

In (S12), after the release member is peeled off and before the hydrophilic treatment is applied, cleaning treatment may be applied to the surface on which the release member of the composite material was attached. In the cleaning treatment, contaminants attached to the surface of the composite material after the release member has been peeled off are removed. For the cleaning treatment, solvent wipe, dry ice blast, or the like can be used.

The "prepreg" is a sheet-like material in which a reinforced fiber sheet is impregnated with a matrix resin. The reinforced fiber sheet is a sheet in which a plurality of reinforced fiber bundles are aligned in one direction, a woven fabric sheet of reinforced fiber bundles, or a non-woven fabric sheet of reinforced fiber bundles. The reinforced fiber is a carbon fiber, a glass fiber, an aramid fiber, a silicon carbide fiber, or the like.

The matrix resin is a thermosetting resin such as an epoxy resin, a phenol resin, a benzoxazine resin, a bismaleimide resin, a cyanate ester resin, an unsaturated polyester resin, or the like. In the prepreg, the matrix resin is in an uncured state or a semi-cured state where the matrix resin is not completely cured and is adhesive. The semi-cured state refers to a state where the matrix resin has not yet been gelled and can be sufficiently softened when reheated.

The prepreg may contain a filler, a thermoplastic resin, a solvent, or the like for improvement of the function.

The contaminant may be silicone, fluorine, or oil derived from a release member (a release film, a release agent, or the like) used when the prepreg is produced, an organic substance not derived from a prepreg material, or the like.

The absorber is a substance that is used in a prepreg laminating process and can be peeled off after resin absorption. More specifically, the absorber is a cloth, a woven fabric, a non-woven fabric, a porous body, or the like. For example, a peel ply made of a polyester resin can be used as the absorber.

The packaging material is a member that covers the prepreg laminate in a simple manner and enables hermetical seal thereof. The material of the packaging material is nylon, PVC, polyolefin, fluororesin, or the like. The material of the packaging material may be the same as or different from that of the bagging material.

The vacuuming and heating in (S4) described above is performed in a condition where the prepreg laminate is not cured. In particular, it is desirable to perform the vacuuming and heating at a temperature under a gelling temperature. The "gelling temperature" is a temperature at which a storage elastic modulus and a loss elastic modulus found by viscoelasticity measurement intersect with each other. For example, in a case of a laminate with prepregs of a 180° C. curable epoxy resin, by performing the vacuuming and heating at 70° C. for about 10 minutes, it is possible to cause the absorber to absorb and remove silicone, fluorine, or a resin containing silicone or fluorine remaining on the surface without curing the prepregs. Note that the heating is performed at a temperature that does not deteriorate the absorber.

The absorber is peeled off from the prepreg laminate before the prepreg laminate is cured. This can prevent the component derived from the absorber (for example, a polyester component in a case of a polyester peel ply) from remaining on the surface of the prepreg laminate. For example, the element ratio of silicone on the surface of a prepreg laminate (a surface planned for bonding) after the absorber has been peeled off may be preferably 1% or less.

Herein, the expression "not curing/cured" or "before curing/cured" means that a curing reaction is not in progress or a curing reaction is in progress but a resin is not gelled.

The release member is a release film, a release sheet coated with a release agent, a release woven fabric, or the like.

The release member is a member that does not transfer silicone or fluorine. The release member that does not transfer silicone or fluorine is, for example, a polyolefin film, a polyolefin coat sheet, a non-transfer silicone film, or a non-transfer fluorine film. The expression "not transfer/non-transfer" indicates that silicone and/or fluorine contained in a film is increased in molecular weight (molecular weight of 2000 or higher) and is firmly bound, and does not transition during curing of the prepreg. Note that transferred substances are often derived from these low molecular components. It is preferable that the release member be formed of a material not containing silicone or fluorine.

Herein, the expression "not contain" means that neither silicone nor fluorine is contained in the chemical composition of a resin and that neither silicone nor fluorine is intentionally added to or coated on a release member. The expression "not contain" tolerates inevitably mixed silicone and fluorine (<1%).

The hydrophilic treatment can hydrophilize and activate the surface of a composite material. The hydrophilic treatment is to add a polar functional group to the composite material surface. The hydrophilic treatment is plasma treatment, corona treatment, ultraviolet treatment, flame treatment, a process using a liquid, or the like. The plasma treatment is to irradiate the surface of a composite material (the surface on which a release member was attached) with plasma by using an atmospheric pressure plasma irradiation apparatus or the like. In a case of corona treatment, corona discharge irradiation is applied to the surface of a composite material (the surface on which a release member was attached) by using a corona discharge surface treatment apparatus or the like. In the ultraviolet treatment, the surface of the composite material is irradiated with an ultraviolet ray of a wavelength of 10 to 400 nm by using an ultraviolet irradiation apparatus. In a process using a liquid, the surface is oxidized or etched by using a chemical such as an acid, an alkaline, an oxidizing agent, or the like (for example, sulfuric acid, chromic acid, or the like), or a compound having affinity with both an adhesive agent and an adherent agent (for example, a primer, a silane coupling agent, or the like) is coated on the surface.

Herein, the expression "activate" means that the surface free energy is increased. The term "surface free energy" is excessive energy of surface molecules. The larger this value is, the larger the force contributing to adhesion will be.

The hydrophilic treatment may be performed so that the surface free energy of a composite material exceeds 60 $mN/m^2$. Note that the surface free energy of general composite materials to which no hydrophilic treatment has been applied is 30 $mN/m^2$ to 50 $mN/m^2$.

Next, effects and advantages of the present embodiment will be described.

(Absorber)

Figure 2:
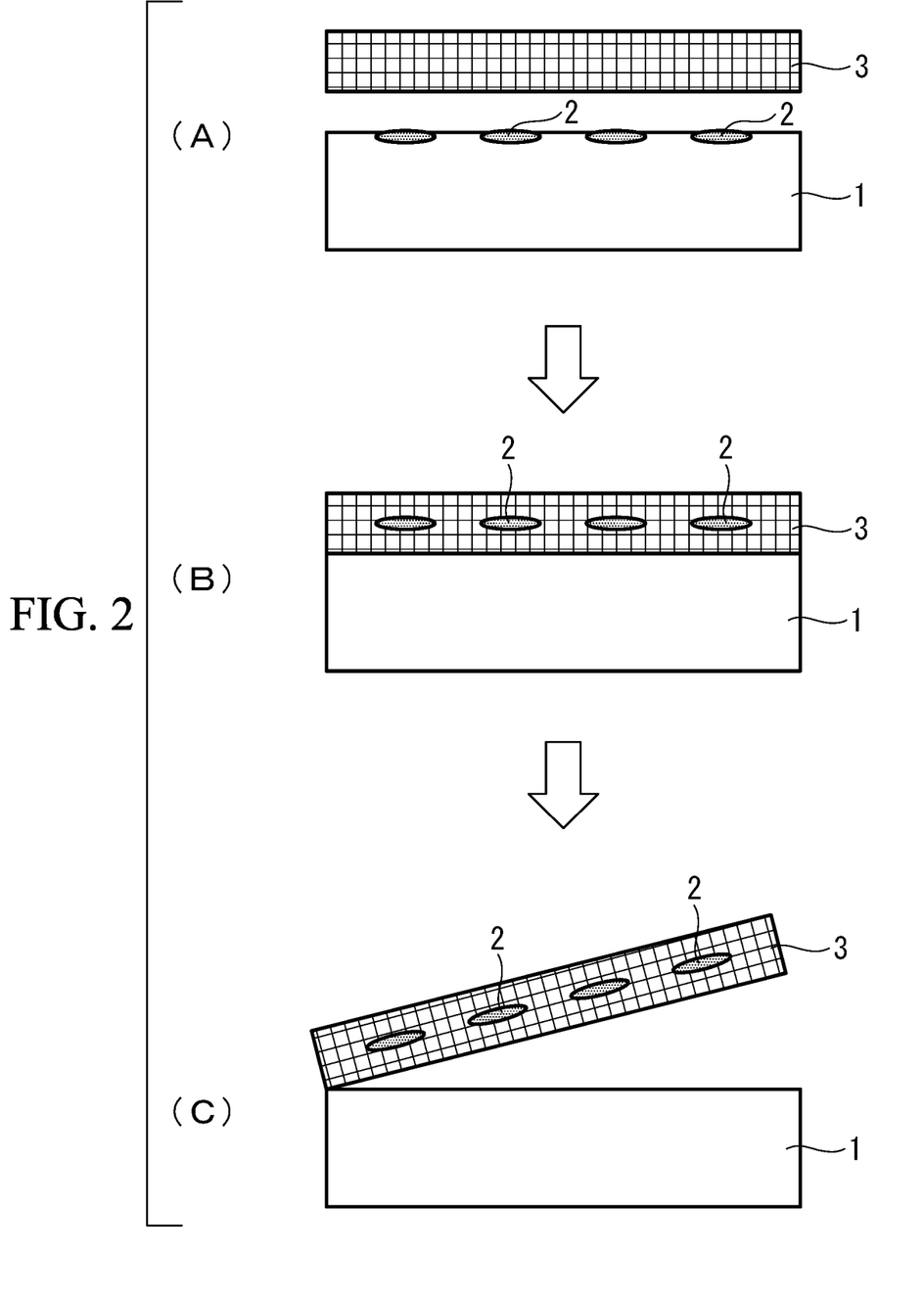
FIG. 2 is a schematic diagram illustrating effect and advantage of an absorber.

Contaminants 2 may be present on the surface of a prepreg 1. An absorber 3 is attached to such a surface (FIG. 2(A)), vacuuming is performed, and thereby the contaminants 2 or a matrix resin containing the contaminants 2 are impregnated into the absorber 3 (FIG. 2(B)). Herein, combined use of heating softens the matrix resin of the prepreg 1 and thus allows the contaminants 2 and the matrix resin to be effectively impregnated into the absorber 3 (FIG. 2(B)). Then, the absorber 3 is peeled off, and thereby the contaminants 2 are removed from the surface of the prepreg 1 (FIG. 2(C)). Herein, since the absorber 3 is peeled off before the matrix resin is cured, the component derived from the absorber 3 does not remain on the surface on the prepreg 1.

(Release Member)

According to the present embodiment, instead of the conventional peel ply, the release member that does not transfer silicone or fluorine to a resin is attached to a prepreg laminate when a composite material is molded, and thus no peel ply component remains on the surface of the composite material.

Since the release member does not transfer silicone or fluorine to a resin, neither silicon nor fluorine remains on the surface of the composite material even when the release member is peeled off after the prepreg is cured. According to the present embodiment, by preventing components derived from the peel ply and the release member from remaining on the composite material, it is possible to prevent a reduction in adhesive strength of a composite material joined body caused by the components.

(Surface Treatment)

Because the hydrophilic treatment is performed, oxygen radicals are generated on the surface of a composite material. Oxygen radicals react with carbon (C) or hydrogen (H) of surface dirt (contaminant) such as an oil, an organic substance. Accordingly, the contaminant is removed as $CO_2$ or $H_2O$ from the surface of the composite material. Because the hydrophilic treatment is performed, the amount of fluorine on the surface of the composite material can be reduced.

Because the hydrophilic treatment is performed, a polar functional group containing oxygen on the surface of the composite material, for example, a hydroxy group (OH), a carbonyl group (C=O), a carboxyl group (COOH), or the like are generated on the surface of the composite material. These functional groups are hydrogen-bound to an adhesive agent. This exhibits stronger adhesive force than the van der Waals force and improves the adhesive strength of bonding between the composite material and a member.

The composite material in which a polar functional group is generated exhibits increased surface free energy and enhanced adhesive strength. This can compensate for a reduction in adhesive strength due to contaminants even when contaminants remain.

The hydrophilic treatment can more stably clean the surface than sanding.

Note that a member to be bonded to the composite material may be a composite material cured in advance, an uncured prepreg laminate (precursor of the composite material), or a metal. When the member is a composite material cured in advance, it is preferable to similarly perform pre-bonding treatment on the surface to be bonded of the composite material.

The adhesive agent may be an epoxy-based agent, an acrylic-based agent, an urethan-based agent, or the like. In particular, a sheet-like heat-curable epoxy-based agent is preferable. When the member is an uncured prepreg laminate, the member is placed on the composite material via the adhesive agent, and the member and the composite material are integrally cured together with the adhesive agent.

Only when the member is an uncured prepreg laminate and the surface is activated, no adhesive agent may be used.

According to the present embodiment, contamination on the prepreg surface and the composite material surface is reduced to form a surface suitable for bonding, and thereby the quality of a bonded part of the composite material can be stabilized.

Second Embodiment

In the present embodiment, a resin support member that does not transfer silicone or fluorine to a resin is used to produce prepregs, and multiple layers of the prepregs are laminated to form a prepreg laminate. The subsequent treatment is performed in the same manner as in the first embodiment.

Figure 3:
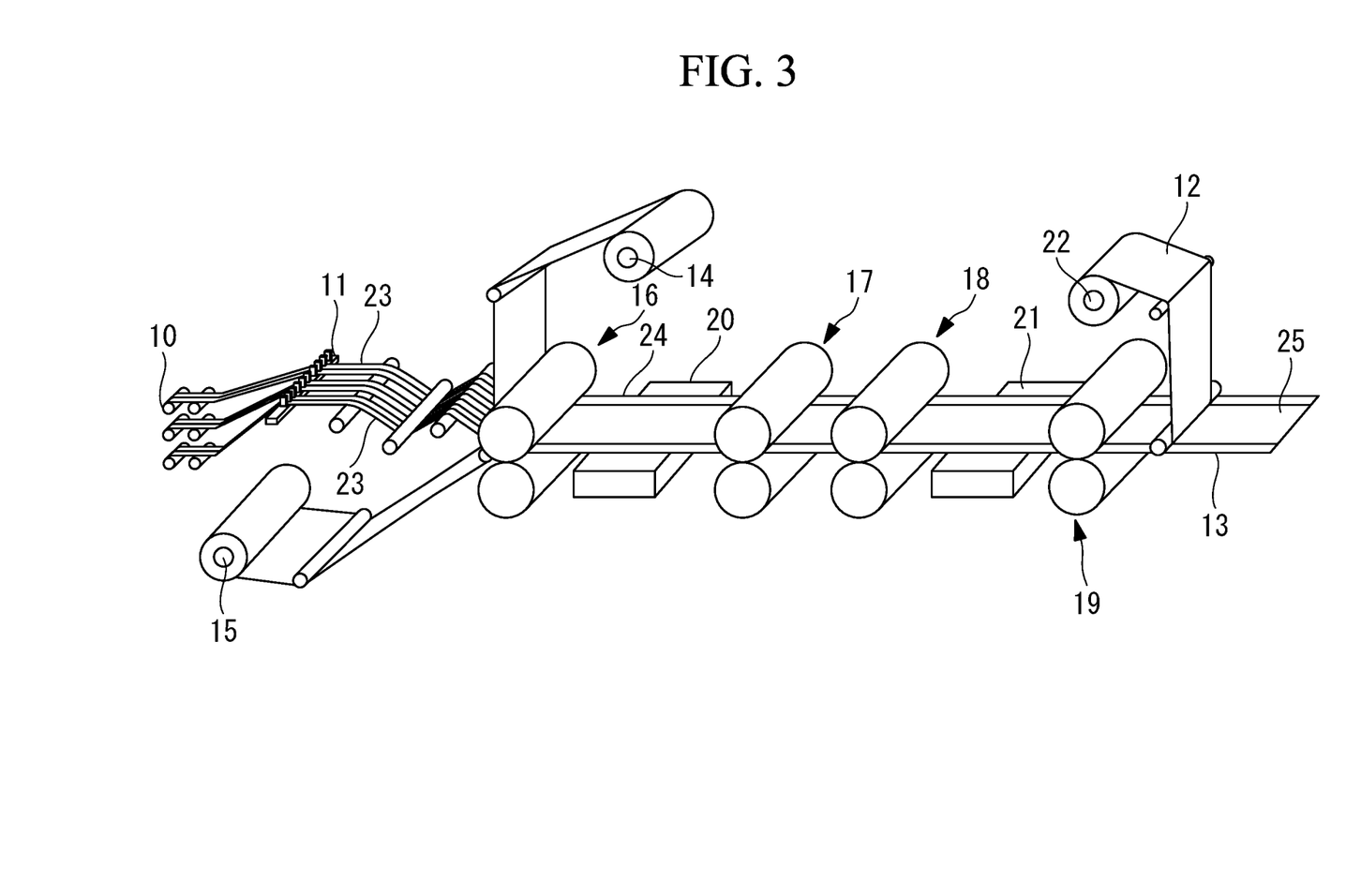
FIG. 3 is a diagram illustrating one example of a prepreg production apparatus.

FIG. 3 is an example of an apparatus that produces prepregs.

The prepreg production apparatus includes a creel 10 that supplies reinforced fibers, a comb 11 that unidirectionally aligns the reinforced fibers supplied from the creel 10, unwinding rolls 14 and 15 that supply resin support members 12 and 13, one sides of which are coated with a matrix resin, nip rolls 16, 17, and 18, a traction roll 19, a heating unit 20 arranged between the nip roll 16 and the nip roll 17, a cooling unit 21 arranged between the nip roll 18 and the traction roll 19, and a winding roll 22 that winds up the resin support member 12 supplied from the unwinding roll 14.

The resin support member 12 supplied from the unwinding roll 14 is supplied to one of the rolls forming the nip roll 16. The resin support member 13 supplied from the unwinding roll 15 is supplied to the other roll forming the nip roll 16.

Between a pair of rolls forming the nip roll 16, reinforced fibers 23 supplied from the creel 10 and unidirectionally aligned by the comb 11 are held by the resin support members 12 and 13, one sides of which are coated with the matrix resin, and thereby a laminate 24 is formed. In this state, the resin support member 12 and 13 are supplied to the nip roll 16 such that the sides coated with the matrix resin are located on the reinforced fiber 23 side.

The laminate 24 sequentially passes through the nip rolls 16 to 18 and is heated by the heating unit 20, and thereby the reinforced fiber 23 is impregnated with the matrix resin. The laminate 24 is cooled into a prepreg 25 by the cooling unit 21. The heating is performed in a predetermined condition where the matrix resin is in a semi-cured state.

After the prepreg 25 passes through the traction roll 19, the resin support member 12 is wound up by the winding roll 22.

The resin support member 13 attached to one side of the prepreg 25 is peeled off before the prepregs are laminated.

Each of the resin support members 12 and 13 is a release sheet, a release film, a release woven fabric, or the like. The resin support member that does not transfer silicone or fluorine to a resin is, for example, a polyolefin film, a polyolefin coat sheet, a non-transfer silicone film, a non-transfer fluorine film, or the like. It is desirable that the resin support member be formed of a material not containing silicone or fluorine.

According to the present embodiment, since prepregs are produced by using resin support members that do not transfer silicone or fluorine to a resin, neither silicone nor fluorine derived from the resin support member remains on the prepreg surface. Combined use of a release member that does not transfer silicone or fluorine to a resin can further stabilize the quality of a bonded part.

REFERENCE SIGNS LIST 1, 25 prepreg
2 contaminant
3 absorber
10 creel
11 comb
12, 13 resin support member
14, 15 unwinding roll
16, 17, 18 nip roll
19 traction roll
20 heating unit
21 cooling unit
22 winding roll
23 reinforced fiber
24 laminate

The invention claimed is:

1. A composite pre-bonding treatment method performed when bonding a composite material to a member, the composite pre-bonding treatment method comprising:
attaching an absorber adapted to absorb a contaminant to a surface of a prepreg laminate that is a precursor of the composite material;
covering the prepreg laminate with a packaging material from above the absorber;
vacuuming the packaging material and heating the prepreg laminate at a temperature lower than a curing temperature of a prepreg of the prepreg laminate and under a condition where a matrix resin of the prepreg is not gelled;
then removing the packaging material;
peeling off the absorber from the prepreg laminate with the matrix resin not gelled;
attaching, to a surface of the prepreg laminate with the absorber peeled off, a release member that does not transfer silicone or fluorine to a resin, and then completely curing the prepreg laminate to mold the composite material;

peeling off the release member from the composite material before bonding the member; and after peeling off the release member and before bonding the member, applying hydrophilic treatment to a surface of the composite material on which the release member was attached, wherein the release member is a non-transfer silicone film consisting of silicone having a molecular weight of 2000 or higher and/or a non-transfer fluorine film consisting of fluorine having a molecular weight of 2000 or higher.

2. The composite pre-bonding treatment method according to claim 1, wherein the hydrophilic treatment is a process of adding a polar functional group to the surface of the composite material on which the release member was attached, through plasma treatment, corona treatment, ultraviolet treatment, flame treatment, or treatment with a liquid.

3. The composite pre-bonding treatment method according to claim 1, wherein before the hydrophilic treatment, applying cleaning treatment to the surface of the composite material on which the release member was attached and removing a contaminant newly attached to the surface of the composite material after peeling off the release member from the surface of the composite material.

4. The composite pre-bonding treatment method according to claim 1 further comprising:

producing the prepreg by using a resin support member that does not transfer silicone or fluorine to a resin; and laminating multiple layers of the prepreg to form the prepreg laminate.

5. A composite pre-bonding treatment method performed when bonding a composite material to a member, the composite pre-bonding treatment method comprising:

producing prepregs with a matrix resin not gelled by using a resin support member that does not transfer silicone or fluorine to a resin;

laminating multiple layers of the prepregs to form a prepreg laminate;

attaching, to a surface of the prepreg laminate, a release member that does not transfer silicone or fluorine to a resin, and then completely curing the prepregs to mold the composite material;

peeling off the release member from the composite material before bonding the member; and after peeling off the release member and before bonding the member, applying hydrophilic treatment to a surface of the composite material on which the release member was attached, wherein the release member is a non-transfer silicone film consisting of silicone having a molecular weight of 2000 or higher and/or a non-transfer fluorine film consisting of fluorine having a molecular weight of 2000 or higher.

\* \* \* \* \*